Feb. 23, 1943.  V. L. KING ET AL  2,312,217
AUTOCLAVE
Filed Oct. 23, 1940   3 Sheets-Sheet 2
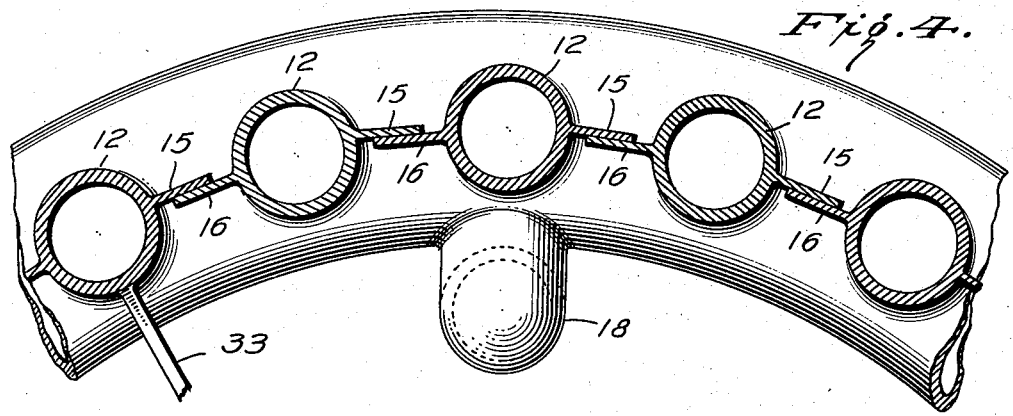
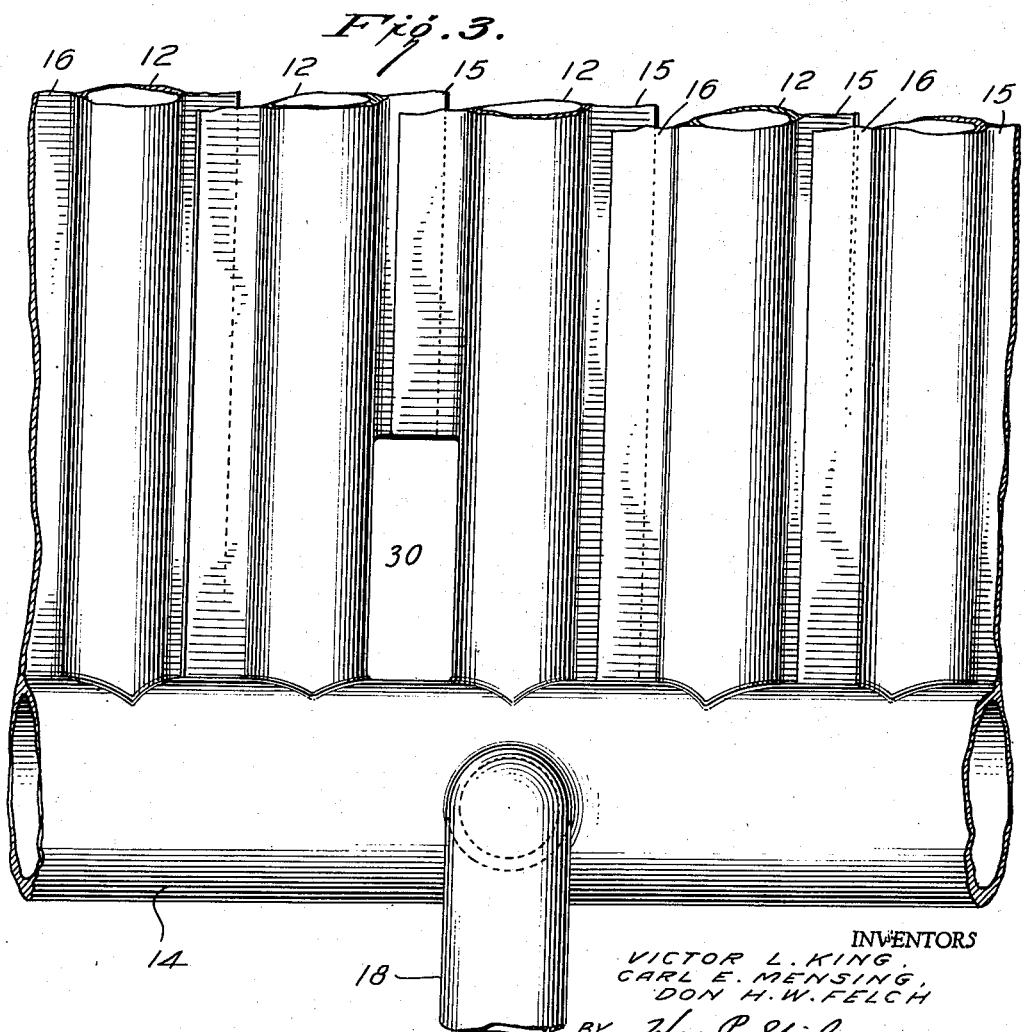
INVENTORS
VICTOR L. KING.
CARL E. MENSING,
DON H. W. FELCH
BY Wm. P. Spielman
ATTORNEY.

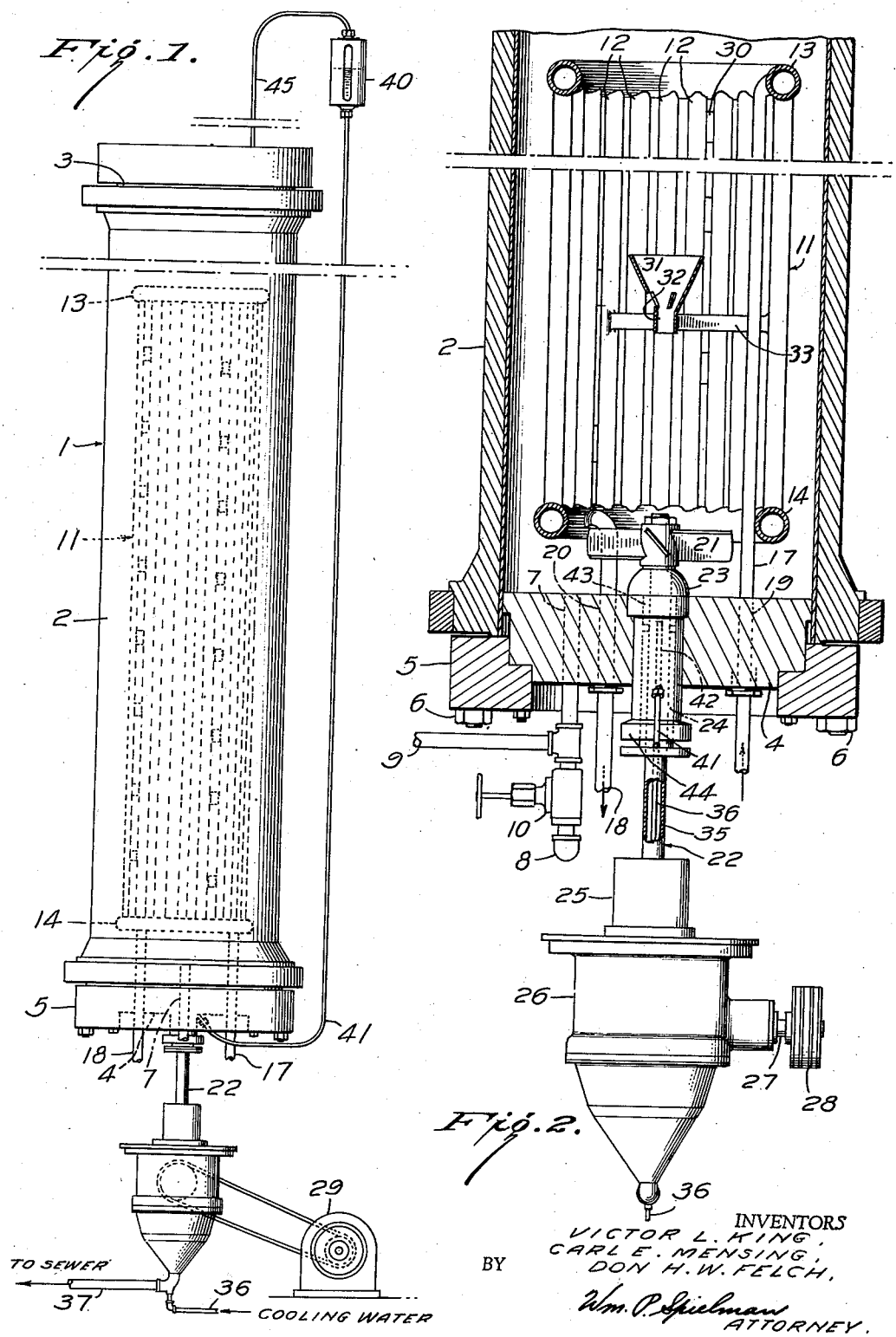

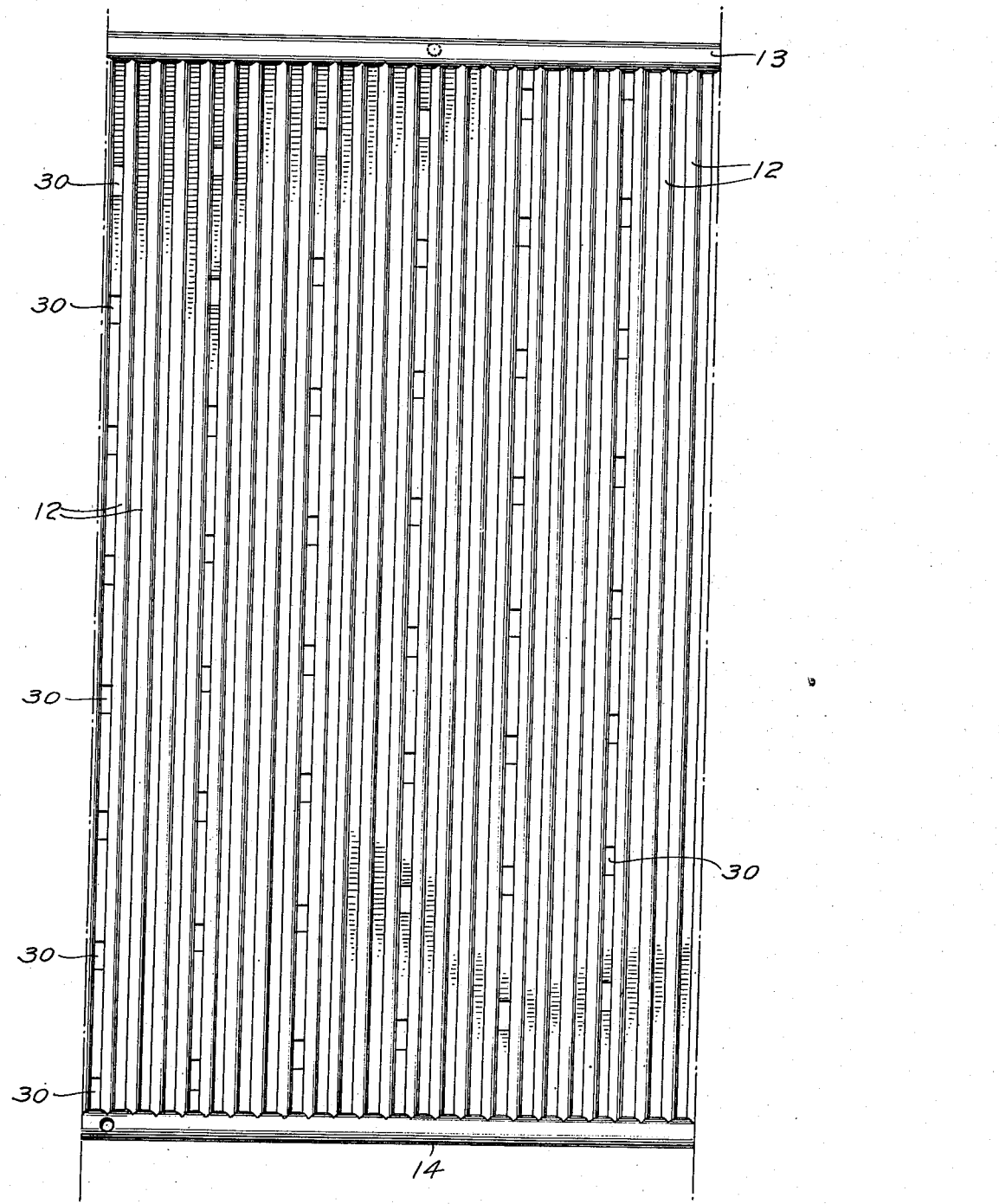

Patented Feb. 23, 1943

2,312,217

UNITED STATES PATENT OFFICE 2,312,217

AUTOCLAVE

Victor L. King, Bound Brook, Carl E. Mensing, Somerville, and Don H. W. Felch, Plainfield, N. J., assignors to American Cyanamid Company, New York, N. Y., a corporation of Maine Application October 23, 1940, Serial No. 362,333

4 Claims. (Cl. 23—290)

This invention relates to improvements in autoclaves such as are used in carrying out chemical reactions under pressure. In its more specific aspects, the invention relates to a new and improved type of autoclave designed especially for treating slurries containing liquids mixed with solid particles. Objects of the invention are to provide an autoclave capable of producing high yields of conversion products of good quality by means of a closely regulated temperature control, to permit a shortened cycle of operations by enabling rapid charging and discharging of the autoclave, and to provide a type of heating and/or cooling means within the autoclave that will not cause settling out, bridging over, or caking of the solid particles contained in slurries undergoing treatment.

Many chemical reactions that must be carried out under high pressures involve the treatment of suspensions or slurries of solids in liquids. Thus, for example, beta-amino-anthraquinone is prepared from a suspension of chloranthraquinone in ammonium hydroxide liquor; 2.6-diamino-anthraquinone is prepared from anthraquinone-2.6-disulfonic acid; and tetra-amino-anthraquinone is prepared from tetrachloranthraquinone and aqueous ammonia. Another type of reaction is one in which the solution undergoing treatment is a relatively clear liquid but the reaction product is a crystalline or amorphous slurry, such as is obtained by the conversion of a solution of cyanamide or dicyandiamide in liquid ammonia into melamine. In this latter case the slurry is the product of the reaction, but the problems involved are the same.

Processes of the above and similar types must be carried out in pressure vessels capable of withstanding both high pressures and high temperatures. Under these circumstances the provision of satisfactory agitators that will maintain the autoclave charge in a fluid condition with adequate provision for temperature regulation has remained a difficult problem. The design of an autoclave capable of withstanding these high pressures and yet operating to produce high yields of conversion products in a minimum of operating time and without clogging or caking constitutes a further and more specific object of our invention.

We have found that the course of the above and similar reactions can be closely controlled within an autoclave capable of withstanding high pressures by the provision of a ring of vertical heating or cooling elements over which the slurry constituting the reaction mixture or the reaction product is recirculated in a vertical circuit. By continuously recirculating a stream of the reaction mixture in this manner we find that the reaction is maintained at a uniform rate throughout all parts of even a large autoclave, so that local temperature differences are avoided and a uniform operation is obtained. Not only does this result in an improvement of the quality of the product from a single autoclave charge, but successive batches prepared in the same autoclave will have substantially the same analysis so that the daily output of the plant is made more uniform.

The details of a preferred modification of our invention, and of the process inherent in its operation, will be illustrated in the accompanying drawings, in which:

Fig. 1 is an assembly drawing with parts broken broken away showing the autoclave, recirculating mechanism and lubricating means;

Fig. 2 is an enlarged vertical section of the lower part of Fig. 1 with parts shown in elevation and parts broken away;

Fig. 3 is an enlarged detail of a lower part of the annular heating baffle of the autoclave;

Fig. 4 is a plan view of the portion of the annular baffle shown in elevation in Fig. 3 with one pipe extended to show the spider attachment; and Fig. 5 is a plane development of the baffle showing the assembly of the heating tubes and the spacing of the orifices in the baffles.

Referring to Fig. 1, the autoclave which is designated generally by reference numeral 1, comprises preferably a cylindrical shell or body member 2 provided with upper and lower heads 3 and 4 respectively. As is shown in greater detail in Fig. 2, the bottom head 4 is fitted inside the outer shell 2 and retained by an annular clamping ring 5 fastened by stud bolts 6, and a similar construction is used for securing the top head of the autoclave.

The autoclave is preferably charged and discharged through an orifice 7 which is bored through the bottom head 4 and which connects with a pipe 8 having a branch pipe 9 and a valve 10. By this means the autoclave may be charged through the valve 10 with a preformed suspension of the reaction mixture, such as a slurry of beta-chloranthraquinone in aqua ammonia, and after the heating cycle is completed the slurry may be discharged through the pipe 9 and a second charge of the reaction mixture admitted immediately while the autoclave is still hot.

Mounted within the autoclave centrally of the shell 2 and spaced from the top and bottom heads 3 and 4 is an annular heating or cooling baffle 11 which operates in accordance with the present invention, both to supply heat to or to cool the reaction mixture therein and to maintain a recirculating stream thereof during a heating or cooling cycle. As is shown in greater detail in Figs. 3, 4 and 5 of the drawings, this baffle is made up of a plurality of substantially vertical heating or cooling tubes 12 and welded at either end to upper and lower annular headers 13 and 14. Flat metal strips 15 and 16 are welded longitudinally to each of the heating tubes 12 on opposite sides thereof, the positions of these strips being such that the outer strip 15 of one tube makes a close sliding fit with the inner strip 16 of the adjacent tube to allow for expansion or contraction upon heating or cooling. The vertical tubes 12 and the strips 15 and 16 form a continuous annular wall having the headers 13 and 14 at the top and bottom thereof and the vertical tubes 12 extending between the headers and constituting a part of the wall. High pressure steam or other suitable temperature regulating medium may be supplied to the upper header 13 through inlet pipe 17 while exhaust steam and condensate are withdrawn from the lower header 14 through the pipe 18. In cooling the autoclave a cooling medium such as water is preferably introduced through the pipe 18 and withdrawn through the pipe 17. Each of the pipes 17 and 18 passes through the bottom head 4 of the autoclave through suitable holes 19 and 20 bored therein.

In order to control positively the speed and degree of recirculation of the reaction mixture within the autoclave, a recirculating means is provided in the form of a propeller 21. This propeller is mounted on a hollow, water-cooled drive shaft 22 which passes through a bushing 23, a bearing 43, a stuffing box 24 and a grease receiver 25, being finally supported by a thrust bearing suitably mounted in a housing 26. Below the bearing it is connected with a set of speed reducing bevel gears which are driven through the shaft 27 and pulley 28 by the motor 29.

During the heating cycle the propeller 21 is in operation, and the conversion products are maintained in a uniform suspension by recirculation upwardly through the annular outer passage formed between the annular baffle 11 and the shell 2 of the autoclave and downwardly through the ring or cylinder formed by the baffle itself. In order to insure a uniform path of travel under conditions where the liquid level does not extend above the upper ring 33, as during charging and discharging of the autoclave, orifices 30 are provided in the strips 15 and 16 that make up the baffle structure. These orifices are spaced along the line of a helix drawn around the cylindrical baffle 11, as shown in Fig. 5 of the drawings, and they therefore permit a continuous recirculation of the reaction mixture, or of the slurry which is the final reaction product, independently of the amount of liquid present in the autoclave. Stagnant heating while charging a hot autoclave and the resulting caking during the charging and discharging periods are thereby avoided, and this is an important advantage of the invention.

The temperature conditions within the autoclave during the heating cycle are most readily followed by the provision of a movable thermocouple located in a thermocouple well (not shown) in the center of the heating baffle 11. This well is inserted through a packing gland located in the top head 3 of the autoclave, and in order to support and retain its lower portion in position when the propeller 21 is in operation a supporting funnel 31 is provided. This funnel has a lower annular portion 32 which is supported by a spider 33 attached to three of the heating tubes 12 as is shown in Fig. 4, and this annular portion makes an easy fit with the thermocouple well and supports it against lateral vibration.

Because of the high pressure and high temperature conditions existing in the autoclave, the problem of driving the propeller 21 is of special importance. In order to maintain a recirculation of the slurry at the speeds necessary to prevent settling and caking a powerful drive is needed for the propeller 21, and special means to support and lubricate the drive shaft 22 are provided by our invention.

As is illustrated in Fig. 2 of the drawings, a bore 35 is provided in the drive shaft 22 extending from its lower end as far as the bushing 23. A water tight connection is made at the lower end of the shaft with a drain pipe 37, and within this pipe there is inserted a small water pipe 36 which extends through the drive shaft 22 to the upper end of the bore. By maintaining a flow of cooling water upwardly through the pipe 36 and downwardly through the bore 35 the shaft 22 and stuffing box 24 are cooled while the autoclave is in operation.

Lubrication of the bearing 43 constitutes another problem that is intensified by the conditions under which the autoclave is operated. By reason of the high pressures generated in the autoclave it is necessary to supply the lubricant under pressure, and yet the use of pressures substantially higher than autoclave pressure would result in the leakage of oil or grease into the autoclave which would contaminate the product. Inasmuch as there may be a considerable variation in the autoclave pressure during the charging and discharging periods as well as during the heating cycle it is evident that pressure lubrication under a constant pressure cannot be resorted to.

We provide a successful solution to the problem of variable pressure lubrication by using the autoclave itself as a generator of pressure for the lubricating oil or grease. For this purpose we provide an oil reservoir 40 which is located a sufficient distance above the normal liquid level in the autoclave to supply a hydrostatic head capable of producing a satisfactory flow of oil into the bearing. An oil line 41 connects this reservoir 40 with a grease lantern 42 located in the housing 44 adjacent the stuffing box 24. A pipe 45 extending through the top head 3 of the autoclave provides communication between the interior of the autoclave and the top of the oil reservoir 40, so that the pressure generated in the autoclave at any time during the heating cycle is transmitted to the surface of the lubricating oil. The result of this construction is that the pressure in the autoclave is balanced by a similar pressure on the surface of the oil, and the flow of oil into the lantern 42 is always under a relatively constant hydrostatic pressure.

From the foregoing it will be seen that the preferred modification of the invention which has been described is one that accomplishes all the objects thereof. During the charging and discharging periods the slurry undergoing treatment is recirculated through a vertical circuit, passing upwardly in the annular space between the baffle structure 11 and the shell 2 of the autoclave, through the orifices 30, and downwardly through the annular passage formed by the ring of heating tubes 12. When the autoclave is filled to its normal operating level the same direction of recirculation is maintained, but the greater part of the flow passes over the top of the upper header 13. In all cases, however, the recirculation is defined by substantially vertical surfaces, as the orifices 30 are formed in relatively thin metal strips and there are no ledges or shelves on which deposits may form. By supplying a cooling or heating medium such as high pressure steam to the ring of vertical temperature regulating elements 12 the proper degree of heating or cooling of the reaction mixture is maintained throughout the entire cycle and a close temperature regulation is thereby maintained at all times. A shortened cycle of operation and greater uniformity in the quality of the product are thereby obtained.

The operation of the autoclave of our invention will now be illustrated: In the manufacture of melamine a solution consisting of equal parts by weight of cyanamide or dicyandiamide, liquid ammonia, and a diluent such as methanol may be employed, while in the manufacture of a guanidine salt such as guanidine nitrate an equivalent quantity of the corresponding ammonium salt such as ammonium nitrate is added to this mixture. The charge is introduced into the autoclave through the valve 10 and pipe 8, and the solution is recirculated by operation of the propeller 21. By reason of the vertical baffle structure 11 the solution is caused to travel upwardly through the annulus formed between the ring of flanged heating tubes 12 and the shell 2 of the autoclave and downwardly within the ring of tubes. During the heating cycle the main flow of liquid is over the top of the header 13, although at least a part of the liquid passes through the orifices 30, but during the discharge period practically all the lateral flow is through these orifices.

The vertical heating tubes 12 are preferably maintained at a temperature of 100–200° C. throughout the heating cycle, and under these conditions a part of the cyanamide or dicyandiamide first reacts with the ammonia to form guanidine according to the following reactions:

(1) $N \equiv C.NH_2 + NH_3 \rightarrow HN = C(NH_2)_2$ (2) 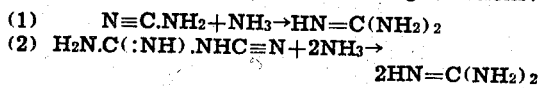
$H_2N.C(:NH).NHC \equiv N + 2NH_3 \rightarrow 2HN = C(NH_2)_2$ The guanidine then combines with more of the starting material to form melamine with regeneration of the ammonia by the reactions (3) $HN = C(NH_2)_2 + 2N \equiv C.NH_2 \rightarrow C_3N_6H_6 + NH_3$ (4) 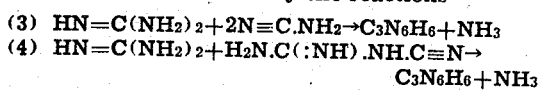
$HN = C(NH_2)_2 + H_2N.C(:NH).NH.C \equiv N \rightarrow C_3N_6H_6 + NH_3$ If an ammonium salt is present such as ammonium nitrate the reactions 3 and 4 are inhibited as the acid radical of the ammonium salt serves to bind the guanidine as a stable guanidine salt and it is no longer free to combine with further amounts of cyanamide or dicyandiamide. In both cases, however, it is important to maintain a close control of the temperature conditions during the conversion for the reasons pointed out above, and we have found that this is best accomplished by maintaining a recirculation of the solution or slurry of the reaction mixture over vertical heating elements as has been described.

What we claim is:

1. An autoclave comprising in combination an outer pressure-resisting shell and a baffle structure centrally located therein, said baffle structure comprising an upper header, a lower header and a ring of vertical tubes provided with overlapping flanges mounted between said headers, means for maintaining a recirculating flow of a fluid reaction mixture downwardly within the ring formed by said tubes and flanges and upwardly outside said ring, and means for supplying a temperature regulating medium to said baffle structure.

2. An autoclave comprising in combination a cylindrical pressure-resisting shell and an annular baffle structure centrally located therein having vertical temperature regulating elements, said baffle being spaced from the walls of said shell to provide a central passage and an outer annular baffle, orifices of substantial width but small area spaced in the sides of said baffle to permit the flow of liquid therethrough, means for maintaining a recirculating flow of a fluid reaction mixture upwardly through said annular passage and downwardly through said central passage, and means for supplying a temperature regulating medium to said temperature regulating elements.

3. An autoclave comprising in combination an outer cylindrical pressure-resisting shell and a cylindrical baffle centrally located therein, said baffle comprising a continuous annular wall having headers at the top and bottom thereof and vertical tubes extending between said headers and constituting part of said wall, said baffle being so constructed and arranged as to have no horizontal ledges or crevices on which solid material may lodge, means for supplying a temperature regulating medium to said baffle, and means for maintaining a recirculating flow of a fluid reaction mixture through the center of said baffle and over the exterior surface thereof.

4. An autoclave comprising in combination an outer cylindrical pressure-resisting shell and a cylindrical baffle centrally located therein, said baffle comprising a continuous annular wall having headers at the top and bottom thereof and vertical tubes extending between said headers and constituting part of said wall, said baffle being so constructed and arranged as to have no horizontal ledges or crevices on which solid material may lodge, means for supplying a temperature regulating medium to said baffle, and a propeller below said baffle adapted upon rotation to recirculate a fluid within the autoclave upwardly through the center of said baffle and downwardly over the exterior surface thereof.

VICTOR L. KING.
CARL E. MENSING.
DON H. W. FELCH.